Patented July 4, 1950

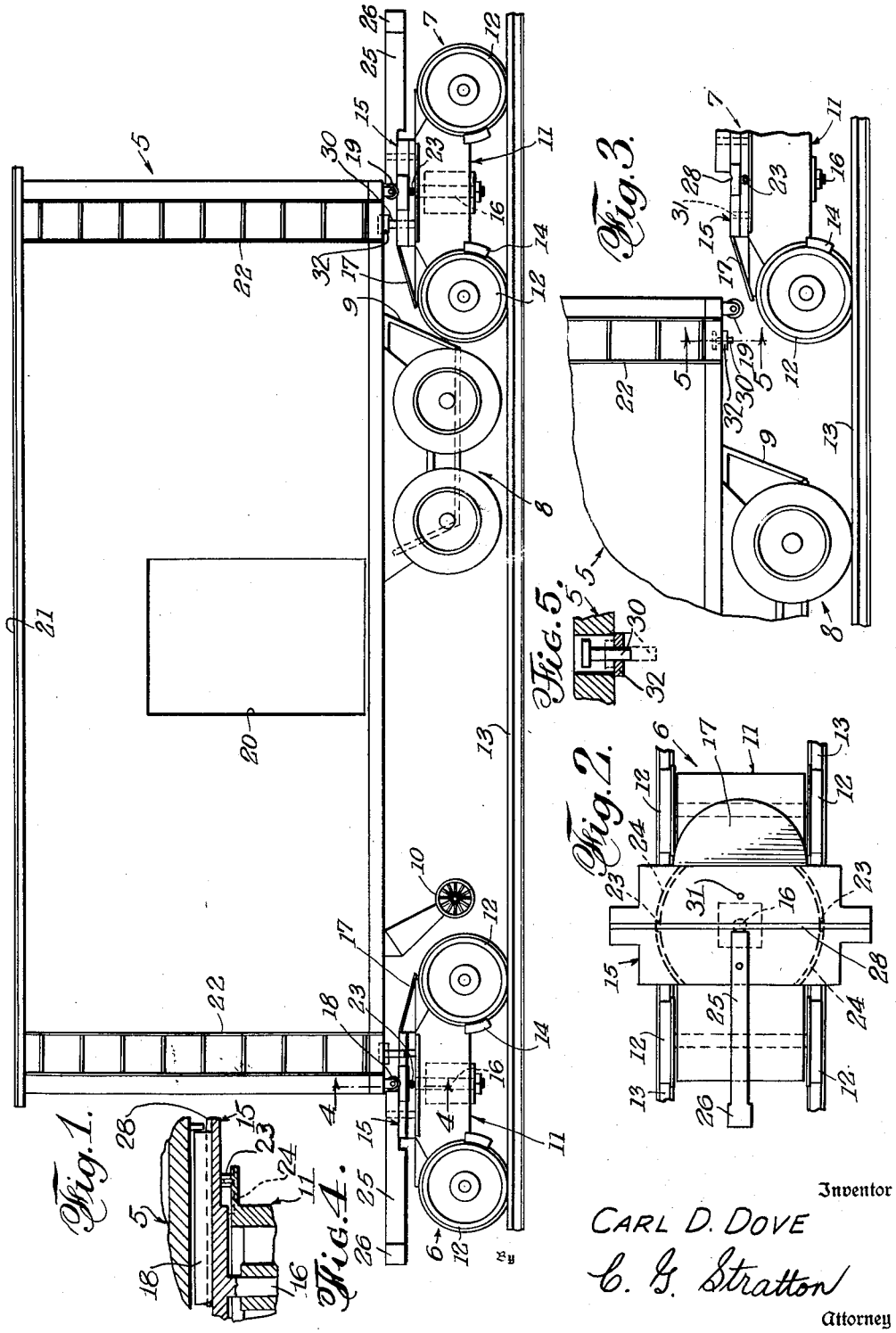

2,513,552

UNITED STATES PATENT OFFICE 2,513,552

COMBINED HIGHWAY AND RAIL FREIGHT UNIT

Carl D. Dove, South Gate, Calif.

Application October 16, 1947, Serial No. 780,144

5 Claims. (Cl. 105—159)

1

This invention relates to freight handling means and deals more particularly with a combined highway and rail freight unit.

An object of the present invention is to provide novel and improved means facilitating the handling of freight for highway and rail transportation, selectively.

Another object of the invention is to provide improved means whereby a van body is readily moved from a condition for travel along a highway to a position for travel on rail-guided trucks whereby goods in the van body are handled with facile ease.

Another object of the invention is to provide a combined highway and rail freight unit which involves a pair of similar railroad trucks, a van body, and novel means for effecting loading of the latter upon the former.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the invention, which is given by way of illustration or example only.

In the drawings, like reference characters designate similar parts in the several views.

Fig. 1 is a side elevational view of a combined highway and rail freight unit embodying features of the present invention.

Fig. 2 is a top plan view of one of a pair of railroad trucks employed in the invention.

Fig. 3 is a broken side view showing a van body in the process of being moved onto one of said trucks.

Fig. 4 is a somewhat enlarged fragmentary sectional view as taken on line 4—4 of Fig. 1.

Fig. 5 is a further enlarged cross-sectional view on line 5—5 of Fig. 3.

The combined highway and rail freight unit which is illustrated in the drawing comprises, generally, a van body 5 and a pair of similar railborne trucks 6 and 7 upon which said van body is adapted to be mounted.

The van body 5 is constructed to include rear wheels 8, and front wheel means 10, normally elevated, but movable to a position to support the front end of the wheel body.

2

Each railroad truck 6 and 7 comprises, generally, a sub-frame 11 mounted on railroad wheels 12 for movement along rails 13, conventional braking means 14 for said wheels, and a van-carrying frame 15 rotationally mounted on the sub-frame 11 as by means of a pivot 16. The frame 15 further includes a sloping loading lip 17 for engagement with roller means 18 and 19 on the bottom of each end of the van body 5.

The van body 5 comprises a generally elongated box-like structure having one or more access openings 20 and, conventionally, may be provided with a catwalk 21 and ladders 22 extending along the sides of the body to said catwalk. The roller means 18 and 19 are preferably provided at opposite ends of said body.

The wheel means 10 are shown in upwardly tilted condition and it will be evident that the same can be swung downwardly to engage the ground and thereby support the front end of the van body when the same is detached from its towing cab.

Means are provided for stabilizing the van-carrying frame 15 of each truck 6 and 7 whereby each respective truck freely rotates without tilt or wobble of its frame 15 on its pivot 16. As shown, said means comprises stabilizing rollers 23 carried by said frame 15 on each side of said pivot and curved tracks 24 for said rollers on the upper face of the sub-frame 11. Thus a pair of trucks 6 and 7, spaced as shown, and mounting a van body 5, may freely accommodate themselves to curves in rails 13 without affecting the position of the van body thereon.

The loading lip 17 of each frame 15 comprises a sloping platform of such height from the ground that either roller 18 or 19 (as best seen in Fig. 3) will readily ride up thereon as the van body is moved thereto. Centrally of each frame 15 and extending transversely along the top thereof, there may be provided a channel-like groove or seat 28 receptive of either rollers 18 or 19. Each frame 15 is further provided with a bumper 25 which, at its outer end, is provided with a conventional railway car coupling 26.

Each bumper is so connected to its respective truck frame 15 as to move relatively thereto while a train of truck-mounted vans is negotiating a curve in track 13. Any conventional connection between the bumpers and truck frames will serve.

Assuming the van body 5 to be coupled to a towing cab with the wheels 8 supporting the same and the wheels 10 elevated as shown, and it is desired to transfer said van body onto a pair of trucks 6 and 7, as seen in Fig. 3, the brakes 14 of one truck, the truck 7, are applied to lock the truck wheels 12, the van body riding on its wheels 8, is backed toward said truck. Now, the van is backed so that roller 19 rides up on loading lip 17 until said roller falls into seat 28 as seen in Fig. 1. The rear end of the van body is thus firmly mounted on truck 7 and the wheels 8 are raised from the ground.

The wheel means 10 are then lowered to support the front end of the van body and either the truck 6 is moved toward said body to raise its front end by causing the roller 18 to rise up on its lip 17, or the brakes 14 of said truck 6 are set and the van body together with the truck 7 are moved toward truck 6 to effect loading of the van thereon. Suitable means may be provided to lock the van body on its trucks to obviate shifting thereof under shock. Such means may comprise one or more lock pins 30, carried by the van body, that are movable into seats 31 in the frames 15 of the trucks. Said pins may be frictionally engaged with the sill or floor of the van or in a suitable fitting 32 secured to said floor to retain a retracted or projected position, as the case may be.

By locking the brakes of one truck, the other can readily be withdrawn from van supporting position to restore the van to its initial wheel supported condition for movement along a highway.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A combined highway and rail freight unit comprising a van body having rear wheels to support the rear end of the same while moving along a highway, a pair of similar railroad trucks each comprising a truck sub-frame having rail-engaging wheels and a van-carrying frame rotationally connected to said sub-frame and having a sloping loading lip, roller means on the bottom of each end of the van body adapted to engage said loading lips while the van body is moved successively toward each truck, whereby said roller means ride upwardly on said lips to a position upon each van-carrying frame and thereby lifts the van body and its wheels off the ground, the top of each van-carrying frame having a groove to receive the rollers, and means to releasably lock the van body to each van carrying frame.

2. A combined highway and rail freight unit comprising a van body having rear wheels to support the rear end of the same while moving along a highway, a pair of similar railroad trucks each comprising a truck sub-frame having rail-engaging wheels and a van-carrying frame rotationally connected to said sub-frame and having a sloping loading lip, said railroad truck further including stabilizing roller means comprising a roller carried by the van-carrying frame on each side of the rotational connection and tracks on the sub-frame for said roller means, roller means on the bottom of each end of the van body adapted to engage said loading lips while the van body is moved successively toward each truck, whereby said roller means ride upwardly on said lips to a position upon each van-carrying frame and thereby lifts the van body and its wheels off the ground, the top of each van-carrying frame having a groove to receive the rollers, and means to releasably lock the van body to each van carrying frame.

3. A combined highway and rail freight unit comprising a van body, a transverse roller at the bottom of each end of said body, and a truck for supporting each end of said body, each truck comprising a rail-mounted sub-frame and a van-carrying frame pivotally mounted thereon for horizontal rotational movement of the sub-frame with respect to the van-carrying frame, the van-carrying frame having a sloping lip up which one of said rollers is adapted to ride to raise the associated end of the van, said latter frame having a transverse groove in its upper face to receive said roller to thereby connect the truck and the van whereby said van-carrying frame is non-rotational with respect to the van, and means carried by the van to releasably lock the same to the van-carrying frame.

4. A combined highway and rail freight unit comprising a van body having rear wheels to support the rear end of the same while moving along a highway, wheels at the front end of the van body normally out of engagement with the highway, a pair of similar railroad trucks each including a pivoted frame having a sloping loading lip, roller means on each end of said van body adapted to engage and ride up on the loading lip of one truck while the van body is moved on its rear wheels toward said latter truck and to engage and ride up on the loading lip of the other truck with the wheels at the front of said van body moved to non-supporting position, the pivoted frame of each truck having a groove for receiving said rollers, and means to releasably lock the van body to each truck.

5. A combined highway and rail freight unit comprising a van body having rear wheels to support the rear end of the same while moving along a highway, wheels at the front end of the van body normally out of engagement with the highway, a pair of similar railroad trucks each including a pivoted frame having a sloping loading lip, roller means on each end of said van body adapted to engage and ride up on the loading lip of one truck while the van body is moved on its rear wheels toward said latter truck and to engage and ride up on the loading lip of the other truck with the wheels at the front of said van body moved to non-supporting position, the pivoted frame of each truck having a groove for receiving said rollers, brake means on each truck to hold the same immobile during loading of the van body thereon, and means to releasably lock the van body to each truck.

CARL D. DOVE.

REFERENCES CITED

The following references are of record in the file of this patent:

UNITED STATES PATENTS

| Number | Name | Date |
|---|---|---|
| 1,595,880 | Schmid | Aug. 10, 1926 |
| 1,660,948 | Winn | Feb. 28, 1928 |
| 1,948,677 | Robin | Feb. 27, 1934 |
| 2,036,535 | Nelson | Apr. 7, 1936 |
| 2,070,702 | Willeme | Feb. 16, 1937 |
| 2,144,243 | Fraser et al. | Jan. 17, 1939 |
| 2,229,258 | Ronk | Jan. 21, 1941 |
| 2,263,578 | Hickman | Nov. 25, 1941 |
| 2,267,338 | Nugent | Dec. 23, 1941 |